United States Patent [19]

Ore

[11] 4,284,614
[45] Aug. 18, 1981

[54] PROCESS FOR PRODUCTION OF HIGH PURITY PHOSPHORIC ACID FROM HIGH ALUMINA PHOSPHATE PEBBLE ROCK

[75] Inventor: Fernando Oré, Whittier, Calif.

[73] Assignee: Occidental Petroleum Corp., Irvine, Calif.

[21] Appl. No.: 145,641

[22] Filed: May 1, 1980

Related U.S. Application Data

[63] Continuation-in-part of Ser. No. 676,559, Apr. 13, 1976, abandoned, which is a continuation-in-part of Ser. No. 583,687, Jun. 4, 1975, abandoned, which is a continuation of Ser. No. 301,085, Oct. 26, 1972, abandoned, which is a continuation-in-part of Ser. No. 204,670, Dec. 3, 1971, abandoned.

[51] Int. Cl.³ .................... C01B 25/46; C01B 25/22
[52] U.S. Cl. .................. 423/321 S; 423/167; 423/319; 423/320
[58] Field of Search .............. 423/167, 319, 320, 321, 423/321 S

[56] References Cited

U.S. PATENT DOCUMENTS

| | | | |
|---|---|---|---|
| 1,894,514 | 1/1933 | Heckenblerkner | 423/320 |
| 2,013,970 | 9/1935 | Moore | 423/320 |
| 2,288,752 | 7/1942 | Simpson | 423/321 |
| 3,694,153 | 9/1972 | Williams et al. | 423/321 |
| 3,792,151 | 2/1974 | Case | 423/320 |

FOREIGN PATENT DOCUMENTS 39-1201  2/1964  Japan ........................ 423/320

OTHER PUBLICATIONS van Dalen et al., "Proceedings of the International Solvent Extraction Conference", The Hague, 1971, vol. II, pp. 1096–1100.

*Primary Examiner*—Herbert T. Carter
*Attorney, Agent, or Firm*—Barry A. Bisson; Edward A. Grannen, Jr.; William G. Lane

[57] ABSTRACT

High quality phosphoric acid is produced from phosphate rock and high alumina pebble which is a by-product of phosphate rock mining operations. The rock or pebble with or without comminution is digested in phosphoric and sulfuric acid and the resultant phosphoric acid contains the metallic ions normally present in the treated rock and pebble. The metallic ions are then extracted from the acid by ion exchange with a water-immiscible organic sulphonic acid compound (preferably in the presence of an organophosphate or phosphonate). After phase separation the organic phase containing the extracted metallic ions can be regenerated. The process is especially useful when the digestion is done at a $P_2O_5$ concentration and temperature which produces calcium sulfate hemihydrate.

29 Claims, 2 Drawing Figures

PROCESS FOR PRODUCTION OF HIGH PURITY PHOSPHORIC ACID FROM HIGH ALUMINA PHOSPHATE PEBBLE ROCK

CROSS-REFERENCE TO RELATED APPLICATIONS

This is a continuation-in-part of my pending U.S. application Ser. No. 676,559 filed Apr. 13, 1976 (now abandoned) which is a continuation-in-part of my pending U.S. application Ser. No. 583,687 filed on June 4, 1975 (now abandoned) which is a continuation application of my U.S. application Ser. No. 301,085 filed on Oct. 26, 1972 (now abandoned) which is a continuation-in-part of my U.S. application Ser. No. 204,670 filed on Dec. 3, 1971 (now abandoned).

The entire disclosure of all of these parent applications is hereby incorporated herein by reference.

Other related patents and applications, the entire disclosure of all of which are hereby incorporated herein by reference, are the following:

U.S. Pat. No. 4,053,564, issued Oct. 11, 1977, "Extraction Process for Purification of Phosphoric Acid," by Bradford and Ore' now Reissue Ser. No. 83,890 filed Oct. 11, 1979;

U.S. Pat. No. 4,132,760, issued Jan. 2, 1979, "Hemihydrate Type Phosphoric Acid Process Using Reduced Pressure," by Ore', Ellis, and Moore;

U.S. Pat. No. 4,140,748, issued Feb. 20, 1979, "Hemihydrate Type Phosphoric Acid Process with Crystal Modifier," by Ore';

U.S. Pat. No. 4,082,836, issued Apr. 4, 1978, "Process for the Purification of Phosphoric Acid by Extraction," by Ore';

U.S. Pat. No. 4,196,172, issued Apr. 1, 1980, "Hemihydrate Type Phosphoric Acid Process," by Ore', Ellis and Moore;

U.S. Ser. No. 16,650 filed Mar. 1, 1979, "Process for Treating Loaded Extractant from Purification of Phosphoric Acid by Extraction and Recovering Nutrients," by Sikd ar, Winterbottom and Adam;

U.S. Ser. No. 16,651, filed Mar. 1, 1979, "Removal of Magnesium from Loaded Extractant and Closed Loop Stripping Scheme", by Sikdar;

U.S. Ser. No. 840,791, filed Oct. 11, 1977 (now U.S. Pat. No. 4,243,637 issued Jan. 6, 1981), "Process for Recovering Uranium Compound from Wet Process Phosphoric Acid", by Ore' and Bradford.

BACKGROUND OF THE INVENTION

Pebble results as a by-product from phosphate rock mining operations. In Northern Florida the pebble is of high alumina, iron and magnesia content and is considered a waste material which presented a disposal problem. The pebble has a size ranging from ¼" to +14 mesh and a BPL (Bone Phosphate of Lime) value ranging from 38 to about 68 (17.8–31.2% $P_2O_5$). With the declining quality of rock, in recent years small amounts of pebble have been ground and blended into higher quality, beneficiated rock. In the past, pebble having a BPL value higher than 58 (26.6% $P_2O_5$) was stored while the lower grade, high alumina pebble was discarded with the tailings.

Typically, pebble is obtained by screening "as mined" rock and retaining the +14 mesh or "pebble" fraction, but in recent years some pebble has been retained from screening at +10 mesh.

In spite of the tremendous reserve of $P_2O_5$ which the high alumina pebble represents, it was not processed because of its high content of metal compounds such as compounds of calcium, magnesium, aluminum and iron. This is due in part to a need to produce phosphoric acid of low metallic ion content that can be readily converted to superphosphoric acid (70–76% $P_2O_5$) for use in liquid fertilizer manufacture.

When high alumina phosphate pebble rock is digested with phosphoric acid and sulfuric acid to form aqueous phosphoric acid and calcium sulfate by the usual gypsum processes, a great many soluble metallic phosphates are formed. When the phosphoric acid is concentrated to merchant grade phosphoric acid and superphosphoric acid, after removal of the solid calcium sulfate and gangue and after clarification, the presence of the soluble metallic phosphates values greatly increases the viscosity of the phosphoric acid. The viscosity of the phosphoric acid can increase to such an extent that the phosphoric acid cannot be handled or transported as a fluid. As the concentration of phosphoric acid is increased, the solubility of the metallic phosphates sharply decreases to form sludges, scale and complex precipitates in phosphoric acid. These sludges settle out in the phosphoric acid creating storage, handling and transportation problems for the acid. In addition, formation of sludges, scale and precipitates causes an appreciable loss of the $P_2O_5$ values in the phosphoric acid.

As can be seen in the pebble analyses given in the examples herein, the total of the analyses of $Al_2O_3$ and $Fe_2O_3$ in high alumina pebble can be at least about 3.2 weight % (in Example 4) and at least about 3.78% (in Example 1). The total of the analyses for $Al_2O_3$, $Fe_2O_3$ and MgO can be at least about 3.73 (in Example 4) and at least about 4.47 (in Example 1). The weight % CaO can be about 44.1 (in Example 4) and about 43% (in Example 1).

The ratio of each impurity (e.g., metals, $SiO_2$, F, carbonate) to $P_2O_5$ is also indicative of the difficulty of economically manufacturing wet process phosphoric acid from a a given phosphate rock. In general, the $CaO/P_2O_5$ ratio will tell whether the sulfuric acid consumption will be too costly. That is, any calcium in excess of stoichiometric for the so-called "marine apatite" or fluorapetite (e.g., Durango) can be considered undesirable because it can consume sulfuric acid without producing the stoichiometric quantity of phosphoric acid.

When the high alumina pebble is initially converted to impure phosphoric by a hemihydrate process, in the order of 50% less alumina is extracted from the rock into the acid than is extracted by the usual gypsum process which makes 22 to 30% $P_2O_5$ acid V/S at least 36% $P_2O_5$ by hemihydrate processes.

Other factors which made pebble use prohibitive by the gypsum-type wet process is the higher sulfuric acid requirements per ton of pebble, as compared to phosphate rock, to react with and precipitate calcium. This is another advantage which can arise from use of such hemihydrate processes as those of the patents of Ore' and of Ore', Ellis and Moore; namely, lower sulfuric acid consumption.

The following table compares typical phosphate rock and high alumina pebble produced in Northern Florida:

|  | Amount (Weight-Percent) | |
| --- | --- | --- |
| Values | Phosphate Rock | High Alumina Pebble |
| $P_2O_5$ | 34.32 | 27.46 |
| INSOL | 4.5 | 7.80 |
| CaO | 48.4 | 39.90 |
| MgO | 0.3 | 0.76 |
| $Al_2O_3$ | 1.5 | 2.10 |
| $Fe_2O_3$ | 0.6 | 1.30 |
| F | 3.75 | 3.30 |
| $SiO_2$ | 3.0 | 9.90 |
| $CO_2$ | 3.75 | 6.00 |
| Organic Carbon | 0.15 | 0.20 |

The present process can produce low impurity wet process phosphoric acid from such high alumina pebble especially uses the hemihydrate digestion steps.

In Central Florida, the pebble is coarser, generally has a BPL value around 68 (31% $P_2O_5$) and is of lower metallic content than Northern Florida pebble. In addition, it is sand-free and clay lumps disintegrate easily, which aids in its removal. This pebble has a market value because it may be used as a feed to electric furnaces to produce elemental phosphorous and can also be used with phosphate rock within restrictions imposed by product quality standards.

However, high alumina pebble inventory in Central Florida also increased with increased emphasis on low metallic content phosphoric acid which can be converted to high quality superphosphoric acid. This made even more remote the processing of high alumina pebble by the usual gypsum type wet process, in both Central and certainly Northern Florida.

Beneficiated phosphate rock also contains metallic impurities, though less than a high alumina pebble, which are undesirable and complicate the production of superphosphoric acid due to the metallic phosphate complexes that are formed which increase the viscosity of the acid and form sludges, which settle resulting in a $P_2O_5$ loss.

"Pebble or phosphate pebble," as used hereinafter, refers to the phosphate pebble rock, particularly high alumina phosphate pebble rock which is a by-product in phosphate mining operations.

"Pebble acid," as used hereinafter, refers to the phosphoric acid which is made from phosphate pebble rock.

"Sulfonic" acid and "sulphonic" acid are used interchangeably in the specification and have the same meaning.

SUMMARY OF THE INVENTION

The present invention relates to a process for the production of high purity phosphoric acid including superphosphoric acid from phosphate rock and pebble, particularly high alumina pebble.

The invention of this application also relates to a process for the production of high purity phosphoric acid from phosphate rock and pebble, particularly from a high alumina pebble which ordinarily is a by-product in phosphate mining operations and not normally useful for treatment by the standard wet process.

Except for the small amount of phosphate pebble rock used in the production of white phosphorus, the great bulk of low grade high aluminum pebble produced each year is a waste product which is used to fill mined areas or discharged into huge mounds. Phosphate pebble rock mounds as high as 100 feet cover many acres of land in the phosphoric acid production areas of Northern Florida. Primarily, pebble is discarded because of the high impurity acid product which it yields from a gypsum-type wet process treatment, and also because of the economic disadvantages brought about by both the higher sulfuric acid consumption per ton of pebble treated and the low $P_2O_5$ content of the pebble, as compared with phosphate rock.

The process comprises, digesting the rock and/or pebble with relatively weak phosphoric acid ($P_2O_5$ content in the range of about 10 to about 35% by weight) and sulfuric acid at concentrations of from about 90% to about 100% at elevated temperature.

Preferably the digestion is at conditions of temperature and $P_2O_5$ concentration such that calcium sulfate hemihydrate is formed. In such hemihydrate processes, especially those in U.S. Pat. Nos. 4,132,760; 4,140,748 and 4,196,172, a lower proportion of metal impurities is transferred from the pebble to the product acid than in the usual gypsum-type processes. This enables a more pure acid (at a given $P_2O_5$ level) to be produced from the hemihydrate process acid than from the gypsum type acid at about the same extraction conditions.

There is extracted along with $P_2O_5$ values contained in the pebble, metallic ions such as $Ca^{++}$, $Mg^{++}$, $Al^{+++}$, $Fe^{+++}$, and $Fe^{++}$. The liquor obtained from the digestion operation after filtration, which contains phosphoric acid ($P_2O_5$) and the aforementioned impurities is then brought into contact with a water-immiscible organic sulfonic acid compound, preferably dissolved in a water-immiscible solvent for sulfonic acid compounds which extracts some of all of the metallic ionic impurities present. The impurities are retained by the organic phase which is separated from the purified pebble acid phase. The pebble acid is then concentrated to a high purity phosphoric acid ranging from merchant grade acid or less to superphosphoric acid.

The water-immiscible organic sulfonic acid used to extract the impurities is then regenerated for recycle by contact with an inorganic acid, preferably a mineral acid such as sulfuric acid or hydrochloric acid and the salts formed discarded or reprocessed for their market values.

In the practice of the process of this invention, the concentration of the purified acid to merchant grade acid (about 54 percent $P_2O_5$ or more) or superphosphoric acid (about 72 percent $P_2O_5$ or more) is conventional to that employed in phosphoric acid plants except that clarification steps may not be required because no solids will settle if sufficient metallic impurities have been eliminated.

As a consequence, there is less problem in operating the evaporators since the possibility of scaling of heat exchange tubes is substantially reduced.

THE DRAWINGS

FIG. 1 is a schematic diagram depicting an embodiment of the present invention utilizing a two stage process; and FIG. 2 is a schematic depicting another embodiment of the present invention utilizing a two-tank recycle system.

The more important steps in the invention include the following (with numbers in parenthesis referring to locations in FIG. 1 for each step):

(1) reacting high alumina phosphate pebble rock with a phosphoric acid solution at an elevated temperature to extract phosphate values and form monocalcium phosphate (10);

(2) contacting the reaction mass containing the monocalcium phosphate with a concentrated sulfuric acid at an elevated temperature to form calcium sulfate and a crude phosphoric acid containing metallic ion impurities (12);

(3) contacting the crude phosphoric acid phase with a water-immiscible organic phase containing a water-immiscible organic sulfonic acid compound to extract the major ionic metal impurities away from the phosphoric acid (18); and (4) separating a purified phosphoric acid.

By use of this invention, a high quality phosphoric acid is produced from a starting material which was formerly an unwanted by-product, thereby greatly reducing a serious waste disposal problem and enhancing the economics of phosphoric acid production by permitting recovery of a greater amount of phosphorous values contained in the mined rock.

DETAILED DESCRIPTION

Figure 1:
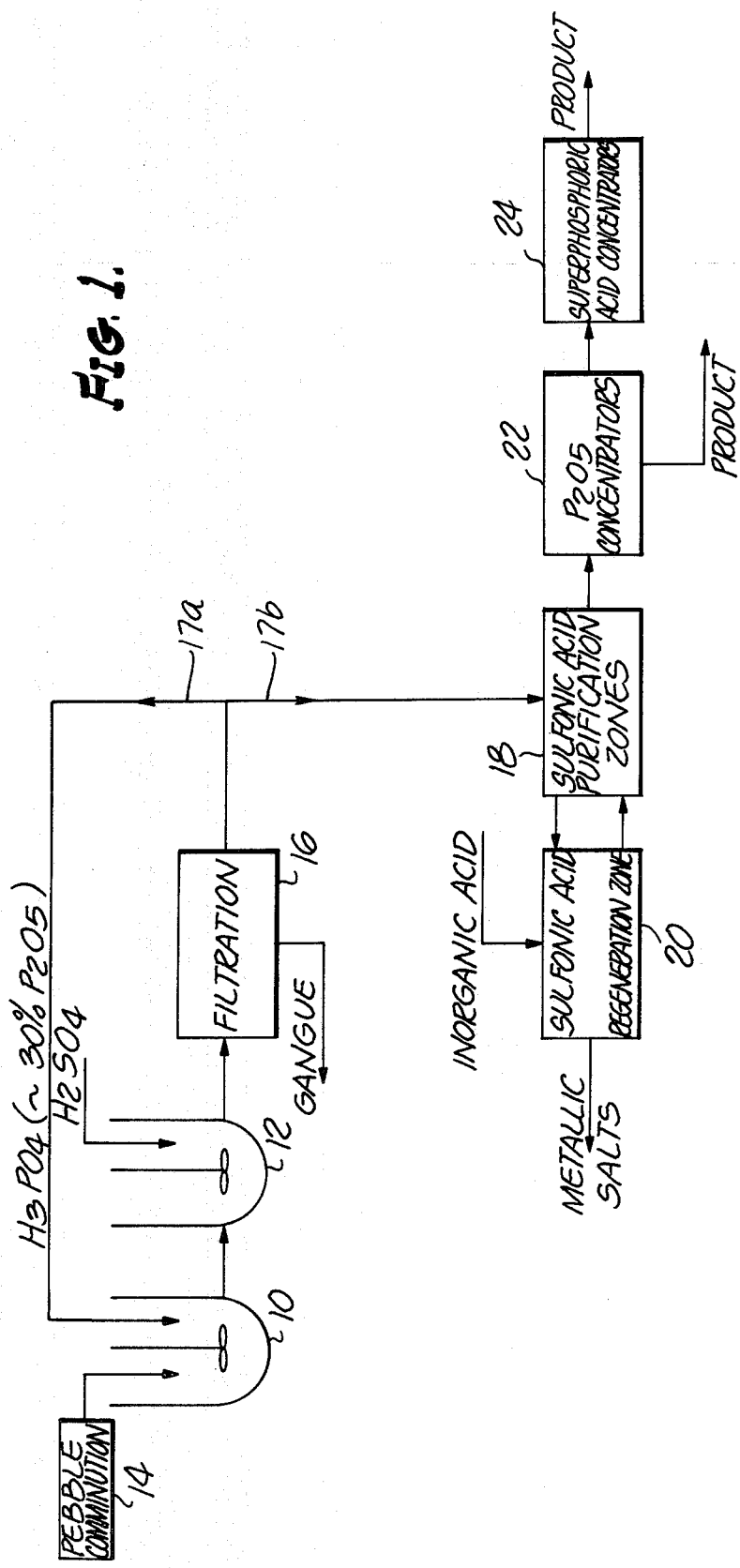

According to the present invention, there is provided a process for the production of high purity phosphoric acid including superphosphoric acid from phosphate rock and pebble especially, high alumina pebble.

The process comprises digesting the rock and/or pebble with dilute phosphoric acid e.g., $P_2O_5$ concentration from about 10 to about 35% at temperatures from 140° to 220° F. The reaction mass is then reacted with sulfuric acid at temperatures from about 140° to 220° F. The preferred processes are those where the $P_2O_5$ concentration and temperature are such that calcium sulfate hemihydrate is formed.

The extracted $P_2O_5$ along the metallic ions, present in the rock and/or pebble, such as $Ca^{++}$, $Mg^{++}$, $Al^{+++}$, $Fe^{+++}$ and $Fe^{++}$ are separated from the residual gangue and calcium sulfate by filtration. The resultant pebble acid is then purified by intimate contact with a water-immiscible organic sulfonic acid compound, preferably dissolved in a water-immiscible organic solvent which serves as an ion-exchange liquid and extracts at least some ions of calcium, magnesium, aluminum and iron from the crude dilute pebble acid more preferred in the presence of the organophosphate and phosphonate additives disclosed in U.S. Pat. No. 4,053,564 and Ser. No. 840,791. The amount and species of metallic ions separated are dependent upon the amount of sulfonic acid extractant brought into contact with the dilute pebble acid. The sulfonic acid compound with its coupled metallic ions is then separated from the weak pebble acid by phase separation.

The pebble acid is the concentrated to any desired grade phosphoric acid, including superphosphoric acid. When phosphate rock is used without resorting to the use of phosphate pebble, in a manner similar to the treatment of pebble rock, phosphoric acid is obtained which contains values extracted from the phosphate rock comprising $P_2O_5$, calcium, magnesium, aluminum and iron. This acid is treated in a manner similar to the pebble acid.

The sulfonic acid compound phase containing the extracted metallic impurities is then regenerated by contact with a mineral acid, preferably sulfuric acid, which returns the sulfonic acid compound to its free $H^+$ form for recycle for further purification of crude dilute pebble acid.

All types of phosphate rock and phosphate pebble ore, both sedimentary and igneous in origin, can be used as feed material in the present process. For example, a lower Ordovician arenaceous schists containing phosphatized Obolus shells, apatite deposits of the Kola peninsula or North Africa, lower Ordovicia Obolus sandstones containing phosphate values, phosphatized Aucell cast and phosphorite nodules in a matrix of glauconitic sand, Rudnichny phosphate rock, phosphatitic glauconite-bearing sands and clays, upper Cretaceous phosphate deposits, lower Cambrian phosphorites, stratified phosphate deposits, Karstic phosphate deposits, sedimentary phosphate deposits, phosphates of lime deposits, amorphous fluo-phosphate deposits, apatite microcrystalline (collophane), pebble ore, shelly granular phosphorites, granular oolitic phosphorites, pebbly phosphorites and the like can be used as feed material with comparable results.

The following table, shows metallic impurities for the "commercial phosphate rocks" of U.S. Pat. No. 3,792,151 Case and examples of the present invention:

| Material | % $Al_2O_3$ | % $Fe_2O_3$ | % MgO | Total | % $P_2O_5$ |
|---|---|---|---|---|---|
| U.S. Pat. No. 3,792,151 Land pebble (high grade) | 0.9 | 0.7 | 0.04 | 1.64 | 35.5 |
| U.S. Pat. No. 3,792,151 Land pebble (furnace grade) | 1.5 | 1.9 | 0.4 | 3.8 | 30.5 |
| N. Florida high alumina pebble (Example 1) | 2.5 | 1.28 | 0.69 | 4.47 | 27.7 |
| "Comminated Pebble rock" (Example 4) | 2.0 | 1.2 | 0.53 | 3.73 | 30.8 |

The total metallic impurities in the high alumina pebble of Example 1 are considered greater than the values shown for either the "high grade" or "furnace grade" of Case.

It should also be noted that the "furnace grade" is, as its name implies, of rather limited utility, if useful at all, for phosphoric acid manufacture by the usual wet process, because of the high metallic impurity content. The present invention permits the use of such furnace grade pebble if the silica content is not excessive.

With reference now to the Drawings, FIG. 1 is a schematic of the process. The first step in the practice of this invention is the digestion of phosphate rock and/or pebble in phosphoric acid. Phosphate rock and/or pebble ($\frac{1}{4}''$ to $+14$ mesh) is comminuted, if necessary, by means of a ball mill or a rod-mill and then added to tank 10 containing phosphoric acid containing from about 10% to about 35% $P_2O_5$, preferably from about 25% to about 35%, and more preferably about 30% $P_2O_5$. It is very important that the rock be of sufficient small size for digestion. The slurry density is between 20% to about 45% solids by weight, preferably about 30%. The temperature of the phosphoric acid is maintained from about 140° F. up to about 220° F., preferably from about 140° F. to about 170° F. and more preferably from about 155° F. to about 170° F. This digestion results in the formation of monocalcium phosphate which is soluble in the phosphoric acid. The reaction mass so produced is then reacted with sulfuric acid at a concentration of from about 90% to 100%, preferably from about 93% to about 96%, at a temperature of from about 140° F. up to about 220° F., preferably from about 140° F. to about 170° F., more preferably from 155° F. to about 170° F.

in a second tank 12. Alternatively the reaction mass can be reacted with sulfuric acid in tank 10. Upon reaction with sulfuric acid, the monocalcium phosphate is converted to calcium sulfate dihydrate and phosphoric acid; the calcium sulfate dihydrate is sparingly soluble in the phosphoric acid. The temperature in tank 12 is maintained from about 140° F. to about 220° F., preferably from 140° F. to about 170° F., and more preferably from 155° F. to about 170° F.

After digestion is completed, the slurry consisting of of phosphate pebble acid containing dissolved metallic impurities such as $Ca^{+2}$, $Mg^{+2}$, $Al^{+3}$, $Fe^{+3}$ and $Fe^{+2}$, phosphate pebble gangue and calcium sulfate dihydrate is transferred to the filtration stage 16 where the gangue and calcium sulfate dihydrate are removed. A portion of the phosphate pebble acid containing the impurities is returned by line 17a to tank 10 to be used in the digestion of additional phosphate pebble rock. The remainder of the phosphate pebble acid is sent to the solvent extraction section 18 by way of line 17b. The $P_2O_5$ content of the acid entering the solvent extraction section is from about 25% to about 35% $P_2O_5$.

Phosphate pebble acid containing metallic impurities comprising $Ca^{++}$, $Mg^{++}$, $Al^{+++}$, $Fe^{+++}$, and $Fe^{++}$ is contacted with a water-immiscible organic sulfonic acid which is dissolved in a water-immiscible organic solvent optionally containing a phase separator adjunct. The volume ratio of the organic phase (water-immiscible organic sulfonic acid dissolved in a water-immiscible organic solvent for the sulfonic acid) to the phosphate pebble acid phase is from about 2 to 1 up to about 12 or more to 1, preferably from about 4 to 1 to about 8 to 1.

The molar concentration of the sulfonic acid present in the water-immiscible organic solvent for the sulfonic acids is at least about 0.1 molar and preferably about 0.3 molar to about 1.0 molar. However, concentrations of the sulfonic acid lower than 0.1 molar can be used in the practice of this invention. There is no set upper limit for the concentration of the sulfonic acid in the organic phase. However, solutions of the sulfonic acid in the water-immiscible organic solvent tend to become quite viscous at high concentrations. The high viscosity reduces the efficiency of the extraction due to poor contact between the organic and the aqueous phases and also results in increased separation time of the two phases.

The extraction operation is carried out in at least one solvent extraction cell, preferably in several cells in series. The phosphate pebble acid and the water-immiscible organic sulfonic acid dissolved in a water-immiscible organic solvent are preferably contacted in a countercurrent manner. However, the contact may be done batchwise.

The organic phase containing the water immiscible organic sulfonic acid dissolved in the water-immiscible organic solvent, which selectively extracts $Ca^{++}$, $Mg^{++}$, $Al^{+++}$, $Fe^{++}$ and $Fe^{+++}$ from the impure phosphate pebble acid, is now separated from the purified phosphate pebble acid. Separation is accomplished by decanting or by overflowing the organic phase which, due to its lower density, forms the top phase in the two phase system. After separation, the purified phosphate pebble acid may be concentrated in concentrators 22 and 24 to produce phosphoric acid containing up to about 85% $P_2O_5$. The concentration is achieved by removing water from the aqueous solution, such as 15 by heating the solution under vacuum.

The organic phase containing the organic sulfonic acid metal salts passes to regeneration zone 20 where the organic sulfonic acid metal salts are contacted with a mineral acid. The action of the mineral acid on the organic sulfonic acid metal salts results in the formation of the organic sulfonic acid in the acid or hydrogen ion form and metal salts of the mineral acid. Separation is by decantation or by overflow as described above. The organic sulfonic acid is returned to the extraction zone 18 and the metal salts of the mineral acid are either discarded or processed for sale.

Figure 2:
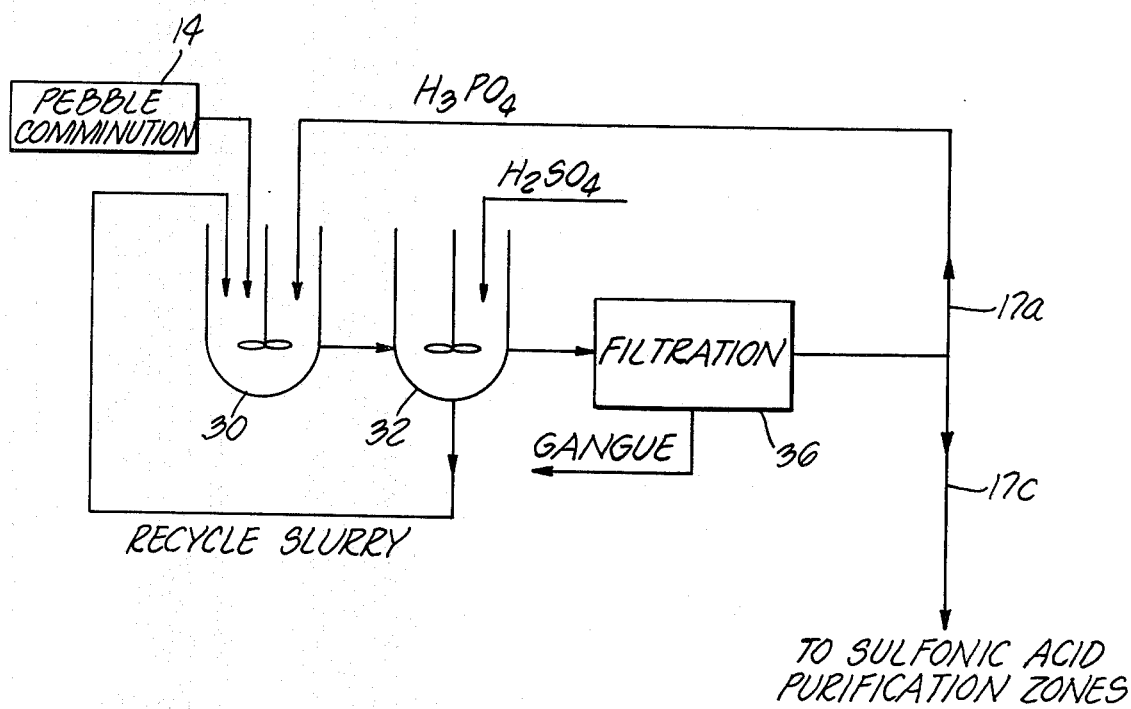

A second embodiment of the process is shown schematically in FIG. 2. The sulfonic acid purification zones are identical to those shown in FIG. 1. Phosphate pebble rock, either beneficiated or in a comminuted form is added to tank 30 which contains phosphoric acid containing about 10% to about 35% $P_2O_5$, preferably about 30% and maintained at a temperature from about 140° F. to about 220° F., preferably from about 180° F. to about 220° F. and more preferably from 190° F. to about 210° F. Reaction of the phosphoric acid with the phosphate pebble rock yields monocalcium phosphate. Reaction of the phosphoric acid with the phosphate pebble rock yields monocalcium phosphate. The slurry density varies from about 20% up to about 45% solids by weight, preferably about 30%. As the digestion in tank 30 proceeds, a portion of the slurry overflows into tank 32. The temperature of the slurry in tank 32 is maintained between about 140° F. up to about 220° F., preferably between about 180° F. up to about 220° F. and more preferably from about 190° F. to about 210° F.

Concentrated sulfuric acid, from about 90% to about 100%, preferably from about 96% to about 99%, preferably in excess of the stoichiometric amount needed to convert the monocalcium phosphate to phosphoric acid (but which can be less than stoichiometric for conversion of all of the calcium in the rock to calcium sulfate, e.g., see U.S. Pat. No. 4,196,172), is added to the slurry in tank 32. Monocalcium phosphate is decomposed to calcium sulfate hemihydrate and phosphoric acid.

A portion of the slurry is constantly recycled back to tank 30 as shown in FIG. 2.

A portion of the slurry passes from tank 32 to filtration stage 36 where the phosphate pebble acid containing the metallic impurities $Ca^{++}$, $Mg^{++}$, $Al^{+++}$, $Fe^{+++}$ and $Fe^{++}$ is separated from calcium sulfate hemihydrate and phosphate pebble gangue. A portion of the phosphate pebble acid from the filtration stage is recycled by way of line 17a to tank 30 to digest phosphate pebble rock as described above. The $P_2O_5$ content of this acid stream is from about 20% to about 45%, preferably about 35%.

Another stream of phosphate pebble acid from the filtration stage 36 passes through line 17c to solvent extraction section 18. The concentration of $P_2O_5$ in this stream varies from about 20% to about 45%, preferably from about 40% to about 45%. This stream of acid is undiluted whereas the stream 17a of phosphate pebble acid recycled to the tank 30 contains water used in washing the gangue and calcium sulfate hemihydrate. Hence the $P_2O_5$ concentration in stream 17a is less than the $P_2O_5$ concentration of stream 17c sent to the solvent extraction section 18 as shown in FIG. 1.

In section 18 the phosphate pebble acid stream 17c containing metallic impurities comprising $Ca^{++}$, $Mg^{++}$, $Al^{+++}$, $Fe^{++}$ and $Fe^{+++}$ is contacted with a water-immiscible organic sulfonic acid which is dissolved in a water-immiscible organic solvent optionally containing a phase separator adjunct. The volume ratio of the organic phase (water-immiscible organic sulfonic acid dissolved in a water-immiscible organic solvent for the sulfonic acid and optionally containing a phase separator adjunct) to the phosphate pebble acid phase is from about 2 to 1 to about 12 or more to 1, preferably from about 4 to 1 to about 8 to 1.

Concentration of the water-immiscible organic sulfonic acid used in the solvent extraction process can vary from about 0.1 molar to about 1.0 molar, preferably from about 0.1 molar to about 0.5 molar and more preferably from 0.35 molar to about 0.45 molar.

The extraction operation is carried out in at least one solvent extraction cell, preferably in several cells in series. The phosphate pebble acid and the water immiscible organic sulfonic acid dissolved in a water immiscible organic solvent are preferably contacted in a countercurrent manner. Extraction on a batch system can also be carried out according to this invention. Preferably the phosphate pebble acid is pretreated before the extraction, as by the processes of Ser. No. 840,791.

The organic phase containing the water immiscible organic sulfonic acid, dissolved in the water immiscible organic solvent, which selectively extracts $Ca^{++}$, $Mg^{++}$, $Al^{+++}$, $Fe^{+++}$ and $Fe^{++}$ from the impure phosphate pebble acid is separated from the purified phosphate pebble acid as described above. The separated phosphate pebble acid may be concentrated in concentrators 22 and 24 as shown in FIG. 1 to produce phosphoric acid containing up to 85% $P_2O_5$.

The organic phase containing the organic sulfonic acid metal salts passes to regeneration zone 20 as shown in FIG. 1 where the organic sulfonic acid metal salts are contacted with a mineral acid. The action of the mineral acid on the organic sulfonic acid metal salts in the formation of the organic sulfonic acid in the acid or hydrogen ion form and metal salts of the mineral acid. Separation is by the methods described above. The organic sulfonic acid is returned to the extraction zone 18 as shown in FIG. 1 and the metal salts of the mineral acid are either discarded or processed for sale.

The water insoluble organic sulfonic acid compounds which may be used to extract metallic ion impurities from the phosphate pebble acid produced, are obtained by conventional sulfonating techniques and may be derivates or aryls, alkonoylaryls, alkyarls and the like as well as mixtures thereof, in which the total carbon atom content is at least 12 carbon atoms, preferably from 14 to 30 carbons atoms.

For purposes of this invention, the term "alkanoylaryls" includes mono-, and di-alkanoylaryls and the term "alkaylaryls" includes mono-, di- and trialkylaryls. Of the aromatic sulfonic acids, there are included aromatic sulfonic acids which are substituted on the aromatic ring with alkoxy, omega-carboxyalkoxy, halo, hydroxy, nitro groups and the like. The organic sulfonic acids can be solids or liquids. When a solid organic sulfonic acid is employed, it can be dissolved in a compatible, i.e., nonreactive or inert, water-immiscible organic solvent for the organic sulfonic acid. Such solvents are described below.

An especially preferred group of sulfonic acids for the present invention are the substituted sulfonic acids described in U.S. Pat. Nos. 4,082,836 and 4,053,564.

These compounds can be made by known chemical processes (e.g., see U.S. Pat. Nos. 4,082,836 and 4,053,564). For example, benzene, phenol or a halo benzene is treated with an alkanoyl halide, such as tetradecanoyl chloride, and an electrophilic catalyst such as boron trifluoride to yield the corresponding alkanoyl compound with normally parasubstitution. When benzene, etc. is treated with one or two molar equivalents of an alkene, such as diisobutylene or tripropylene, or decene in the presence of an acid catalyst, such as aluminum trichloride or concentrated sulfuric acid, the corresponding mono or di-alkyl benzene, phenol or halobenzene is produced. Substitution takes place at the para and ortho positions. The alkyl phenol can then be etherified by first preparing the corresponding alkali salt with an alkali metal hydroxide in an alcohol-hydrocarbon solvent such as xylene and butanol. The alkali metal salt can then be treated with an alkyl halide, such as methyl iodide or ethyl iodide to yield the corresponding alkyl aryl ether. Alternatively the alkali metal salt can be treated with an omega-halocarboxylic acid ester, such ethyl 2-chloroacetate or methyl 3-iodopropionate, to yield the corresponding esterified carboxy alkyl aryl ether. The ester group is hydrolyzed with aqueous hydroxide and the resulting reaction mixture is made slightly acidic to yield the corresponding carboxy alkyl aryl ether. The above compounds are treated with fuming sulfuric in a kerosene solvent to yield the corresponding ortho sulfonic acids. The naphthalene sulfonic acids of formula (II) are similarly made. That is naphthalene or a- or b-hydroxy or halo-naphthalene is alkylated with one to three molar equivalents of an alkene to yield the corresponding mono-, di or trialkyl compound. The hydroxynaphthalenes are etherified in the same fashion as phenols. The naphthalenes are sulfonated with fuming sulfuric acid with the sulfonic acid group going alpha to the hydroxy group, ether group or halo groups located in the 1- or 2- positions of the naphthalene ring. In the unsubstituted alkyl naphthalenes, that is naphthalene without halo, hydroxy groups and the like, the sulfonic acid group goes in position 1 to 2.

Illustrative, but nowise limiting of the water immiscible sulfonic acid compounds which may be used, are lauryl benzene sulfonic acid, polydodecyl benzene sulfonic acid, ethoxynonylbenzene-sulfonic acid, di-isoamylbenzenesulfonic acid, dodecyltoluenesulfonic acid, dinonylnaphthalenesulfonic acid, dioctyl-2-methoxybenzenesulfonic acid, dioctyl-2-hydroxybenzenesulfonic acid, tripentyl-2-(betacarboxyethoxy)-benzenesulfonic acid; octadecyl-2-fluorobenzenesulfonic acid; octadecyl-2-hydroxybenzenesulfonic acid; didecyl-2-bromobenzenesulfonic acid; triocytyl-2-(betapropoxy)-benzenesulfonic acid; dinonyl-2-chlorobenzenesulfonic acid; nonyl-2-ethoxybenzene- sulfonic acid; dioctyl-2-(alphacarboxymethoxy)-benzenesulfonic acid; dinonyl-2-(alphacarboxymethoxy)-benzenesulfonic acid; trioctylbenzene-sulfonic acid; dodecanoyl-2-chlorobenzenesulfonic acid; heptyltridecyl-2-iodobenzenesulfonic acid; dinonyl-2-hydroxy-1-naphthalene-sulfonic acid; diheptyl-2-iodo-1-naphthalenesulfonic acid; heptadecyl-2-(betacarboxyethoxy)-1-naphthalenesulfonic acid; dioctyl-1-ethoxy-2-naphthalenesulfonic acid; hexyldecyl-1-fluoro-2-naphthalene-sulfonic acid; dinonyl-2-methoxy-1-naphthalene sulfonic acid; triheptyl-2-bromo-1-naphthalenesulfonic acid; dioctyl-2-(alphacarboxymethoxy)-1-naphthalenesulfonic acid; diundecyl-1-chloro-2-naphthalenesulfonic acid; tetradecyl-1-(betapropoxy)-2-naphthalenesulfonic acid; dinonyl2-ethoxy-1-naphthalenesulfonic acid; and the like as well as mixtures thereof.

Dinonylnaphthalenesulfonic acid, 5-dodecanoyl-2-chlorobenzenesulfonic acid, 5-nonyl-2-ethoxybenzenesulfonic acid, 3,5-di-ti-octyl-2-(alphacarboxymethoxy)-benzenesulfonic acid, 3,5-di-t-octyl-hydroxybenzenesulfonic acid, dioctylnapthalenesulfonic acid, ethoxynonylbenzenesulfonic acid, dioctyl-hydroxybenzenesulfonic acid, dodecanoyl-chlorobenzenesulfonic acid, dioctyl-(carboxymethoxy)-benzenesulfonic acid and dinonyl-(carboxymethoxy)-benzenesulfonic acid are particularly preferred.

While the water-immiscible organic sulfonic acid compounds may be used as such, to extract the impurities from phosphoric acid, it is more advantageous to use them in solutions with a solvent for the sulfonic acid compound which is also immiscible in water. The solvents reduce the viscosity of the sulfonic acids and promote fast phase separation after the solution of the organic sulfonic acid has been contacted with the crude phosphoric acid.

Illustrative but nowise limiting of the water immiscible organic solvents for the organic sulfonic acid compounds, there may be mentioned, kerosene, mineral spirits, benzene, naphtha, xylene, toluene, nitrobenzene, carbon tetrachloride, chloroform, methylene chloride, trichloroethylene, isooctane, heptane, and the like.

The preferred solvents are saturated hydrocarbons having a boiling point between 120° C. and 230° C.; flash points between 15° C. and 70° C. and viscosities between 1.5 and 1.7 centipoises and densities below the density of the phosphate pebble acid.

In the preferred embodiment of the invention, phase separator adjuncts, such as water-immiscible monohydric alcohols, are employed in concentrations from about 0.1 up to 20 weight percent of the organic phase which consists of the water-immiscible organic sulfonic acid and the water-immiscible organic solvent, preferably from about 5 to 10 weight percent. These adjuncts aid in phase disengagement between the aqueous phosphoric acid phase and the extractant solution and improve the solubility characteristics of the organic sulfonic acid in the organic solvent. Isodecanol is satisfactory as an adjunct although other water-immiscible straight and branched chain aliphatic alcohols are also satisfactory.

At an organic sulfonic acid concentration in a water-immiscible solvent of about 0.4 molar, the ratio of the total water-immiscible organic solvent solution to the phosphoric acid employed in the sulfonic acid compound purification zones may range from about 2 to 1 to about 12 or more to 1, depending upon the extractant power of the organic sulfonic acid employed, the amount of impurities present, the degree of purification required, the $P_2O_5$ content of the phosphate pebble acid and the temperature at which the extraction is carried out.

In general, the organic sulfonic acid extractants will selectively extract cations in the following order: $Ca^{++}$, $Mg^{++}$, then $Fe^{+++}$, $Fe^{++}$, and $Al^{+++}$. It will be appreciated, therefore, that at lower total organic to acid ratios the calcium and magnesium will be preferentially removed whereas additional cations will be removed at the higher ratios. At an organic phase to aqueous phase ratio of about 6 to 1, or more, aluminum and iron ions present are removed in addition to substantially all the calcium and magnesium ions.

Water-immiscible organic acid phosphate compounds constitute another possible component of the organic extractant phase employed in the present process "Organic acid phosphate" is the general name given to mixtures of mono- and di-organo substituted phosphoric acid compounds corresponding to $(RO)PO_3H_2$ and $(RO)_2PO_2H$ respectively. Pure organic acid phosphates either mono-, di- or tri-substituted, can be used. Among the materials which can be used in this process are mixtures of 0.1% to 60.0% by weight monosubstituted and about 99% to about 35% by weight disubstituted organic acid phosphates which can contain about 0.1% to about 1.0% of the alcohol corresponding to the organic substituent, about 0.1% to about 5.0% triorgano- phosphates and about 0.1% to about 3.0% phosphoric acid and condensed phosphates. Organic phosphates especially phosphate acids which can be employed in accordance with the practice of the present process described in greater detail in U.S. Pat. No. 4,053,564.

Illustrative but nowise limiting are the following examples of organic acid phosphates: amyl acid phosphate, isoctyl acid phosphate, 2-ethylhexyl acid phosphate, decyl acid phosphate, lauryl acid phosphate, stearyl acid phosphate, phenyl acid phosphate and octylphenyl acid phosphate, cyclohexyl acid phosphate, cyclohexy phenyl acid phosphate, 1-(5-hexynyl) acid phosphate, 1-(5-hexenyl)-phenyl acid phosphate, 1(6-chlorohexyl) acid phosphate, 1-(6-hydroxyhexyl) acid phosphate and 1-(6-methoxyhexyl) acid phosphate. When aryl-, alkylaryl or alicyclicarylacid phosphates are employed, the aromatic ring can be substituted with a hydroxy, an alkoxy or a halo group.

Water-immiscible organic phosphonates can also be used in this invention. The half-ester can be used. One formula of the phosphonates $R—P(O)(OH)(OR)$ in which R and/or R' can be alkyl, alkenyl, alicyclic, aryl, alkenylaryl, alkylaryl, alicyclicaryl or heterocyclic. The organic substituent groups, R and R', may be substituted with an alkoxy, a hydroxy or a halo group; said R groups may be the same or different. R and/or R' should contain from 4 to about 18 carbon atoms.

The water-immiscible organic sulfonic acid and the water-immiscible organic acid phosphate can be dissolved in water-immiscible organic solvents. The preferred solvents are saturated hydrocarbons having a boiling point between 120° and 230° C., flash points between 15° and 80° C. and densities lower than the density of the phosphoric acid. Either pure hydrocarbons or mixtures of hydrocarbons may be used.

As indicated, extracting operation may be carried out in one or more cells 18, preferably in several cells in a series, with a fresh solution containing the organic sulfonic acid compound in the water-immiscible solvent flowing countercurrent to the flow of the phosphate pebble acid in order that the fresh extractant will remove the remaining trace impurities in the already partially purified phosphate pebble acid. The partially spent organic sulfonic acid solution containing substantial amounts of metallic impurities contacts the phosphate pebble acid feed at a point in the system where the ionic concentration of metallic impurities of the phosphate pebble acid is high. Intimate contact is desired prior to phase separation in each stage.

The organic sulfonic acid solution containing the extracted ionic metallic impurities is then sent to a sulfonic acid regeneration zone 20 as shown in FIG. 1 where it is brought into contact with a mineral acid such as sulfuric acid, hydrochloric acid or nitric acid with sulfuric acid being preferred because of its ready availability in phosphoric acid operations.

The mineral acids remove the extracted metallic cations from the organic sulfonic acids to form salts of the metallic ion for disposal or reprocessing. The regenerated sulfonic acid compound, in its H+ form, is recycled back to the sulfonic acid purification zone 18.

In the sulfonic acid purification zone 18, separation of the sulfonic acid solution containing the extracted ionic metallic impurities from the purified phosphate pebble acid is by phase separation due to the phase immiscibility.

The purified phosphate pebble acid can then be sent to one or more evaporators 22 where water is evaporated from the purified acid to increase its $P_2O_5$ content from about 30% to 45% up to about 54% $P_2O_5$ or more, the latter being regarded as merchant grade phosphoric acid. Because of the removal of ionic metallic impurities with the organic sulfonic acid compounds, no clarification stage need be employed.

Because of extraction of the impurities, the acid is also suitable for conversion to superphosphoric acid. Thus, if desired, the acid after an initial concentration of from 42 to 54% $P_2O_5$ may be sent to superphosphoric acid concentrator 24 where it is concentrated to a $P_2O_5$ level of 70 to 85 percent $P_2O_5$ or more with again the important distinction over conventional phosphoric acid process operations being that no clarification steps are required prior to concentrations.

While nowise limiting, the following are examples of the practice of the process of this invention.

EXAMPLE 1

North Florida high alumina pebble having an approximate composition of 27.7% $P_2O_5$, 9.5% $SiO_2$, 2.5% $Al_2O_3$, 1.28% $Fe_2O_3$, 43% CaO, and 0.69% MgO, was ground to −60 mesh. The ground pebble was next digested in previously prepared pebble acid (30% $P_2O_5$) in batches made of 3780 parts by weight ground pebble and 5250 parts by weight pebble acid in an agitated reaction vessel at a residence time of 1.5 hours per batch.

The digested product, at a slurry density of about 42%, was fed on a continuous basis into a crystallizer where it was contacted with sulfuric acid. Recycle pebble acid was being added.

The crystallizer temperature was maintained at 155° to 170° F. A ratio of $H_2SO_4/P_2O_5$ in the pebble of 2.6 was maintained. The rate of addition of recycle acid was adjusted so as to produce a slurry density of 35 to 40% and a product of about 30% $P_2O_5$. The residence time in the crystallizer was 30 minutes, with the slurry being continuously withdrawn.

The solid phase in the slurry, constituted by the unreacted fraction of pebble, and the gypsum formed by the reaction of calcium phosphate with sulfuric acid was removed by filtration in a batch operation. The composition of the resulting filtrate (pebble acid) was 32.0% $P_2O_5$, 0.98% $SO_4$, 0.64% MgO, 1.20% $Al_2O_3$, 1.26% $Fe_2O_3$, 0.37% CaO and 2.29% F.

The pebble acid was next processed in continuous operation in a four-stage solvent extraction unit. In the first two stages, the pebble acid was contacted countercurrently with 0.58 molar solution of ethoxynonylbenzenesulfonic acid in kerosene, using a total organic to aqueous ratio of six to one. The impurity loaded extractant was continuously regenerated in the last two stages with 2 N sulfuric acid using an organic to aqueous acid ratio of two to one.

The purified phosphoric acid was then concentrated to superphosphoric acid grade (72% $P_2O_5$) in batch operation.

The composition of the superphosphoric acid prepared is presented in Table 1.

TABLE 1

| | |
|---|---|
| $P_2O_5$ | 73.6% |
| $Al_2O_3$ | 0.90% |
| $Fe_2O_3$ | 1.10% |
| CaO | 0.02% |
| MgO | 0.15% |
| Conversion | 57% |
| P/F ratio | >1000 |

EXAMPLE 2

To extract impurities from a phosphoric acid concentrate prepared from the digestion of ground high alumina pebble with phosphoric acid at 160° to 170° F. and then sulfuric acid at 160° to 170°, there was prepared a 0.4 molar solution of dinonylnaphthalenesulfonic acid in mineral spirits which contained 10% by weight isodecanol.

To assure complete activation of the dinonylnaphthalenesulphonic acid, the solvent solution was vigorously contacted with 2 N sulfuric acid in a volumetric solvent to acid ratio of four. Contact was at ambient temperature.

The phases were then allowed to separate and the aqueous phase discarded.

400 Volumes of the acid treated organic sulfonic acid mixture was contacted with 100 volumes of 31% $P_2O_5$ pebble acid with vigorous agitation. The phases were then allowed to separate.

After phase separation, 50 volumes of the aqueous phase were removed for metals analysis. The entire organic phase was stripped again, this time with an equal volume of 2 N sulfuric acid. The stripped solution was separated for metals analysis and 200 volumes of the regenerated organic solution was contacted with the remaining 50 volumes of pebble phosphoric acid preserved from the first contact.

Table 2 presents the results of the two extractions

TABLE 2

| Component | Component Concentration in Pebble Acid g/l | Percent Extracted Stage 1 (%) | Stage 1 + 2 (%) |
|---|---|---|---|
| $Fe_2O_3$ | 16.18 | 18.73 | 24.72 |
| $Al_2O_3$ | 14.27 | 8.48 | 13.39 |
| MgO | 9.15 | 31.91 | 68.09 |
| CaO | 4.73 | 50.53 | 80.13 |

EXAMPLE 3

High alumina pebble rock was treated with phosphoric acid and sulfuric acid then filtered to form pebble acid. It was then treated with the solution described in Example 2 at a total organic to pebble acid ratio of 6 to 1. The resultant pebble acid now purified, was concentrated to form superphosphoric acid. The composition of the product superphosphoric acid is as shown in Table 3.

TABLE 3

| Component | | |
|---|---|---|
| $P_2O_5$ | | 71.1% |
| | Conversion, % | 66.0% |
| | P/F Ratio | >760 |
| $Al_2O_3$ | | 2.67% |
| $Fe_2O_3$ | | 2.33% |
| CaO | | 0.01% |

TABLE 3-continued

| Component | |
|---|---|
| Mg | 0.24% |

EXAMPLE 4

Comminuted pebble rock (−60 mesh) is slowly added to 30% $P_2O_5$ phosphoric acid so as to form a slurry density of about 30%. The reaction mass is maintained at about 205° F. As more pebble rock and phosphoric acid are added, the mass overflows from the first tank into the second tank.

Concentrated sulfuric acid is added to the slurry as it enters the second tank. Monocalcium phosphate reacts with the sulfuric acid forming phosphoric acid and calcium sulfate hemihydrate. An excess of sulfuric acid will usually be used (see Table 4). A portion of the slurry is recycled back to the first tank where more pebble rock and recycle phosphoric acid are added. Another portion of the slurry is sent to the filtration stage. The first quantity of acid recovered is product acid containing from about 40% to about 47% $P_2O_5$. The solids from the slurry after filtration, are washed and the resulting filtrate containing about 30% $P_2O_5$ is recycled back to the first tank.

Table 4 shows the analysis for phosphate pebble acid prepared by the hemihydrate process, values expressed as percent by weight.

TABLE 4

| | $P_2O_5$ | $Al_2O_3$ | $Fe_2O_3$ | MgO | CaO | $SO_4$ |
|---|---|---|---|---|---|---|
| Starting Mat. | 30.8 | 2.0 | 1.2 | 0.53 | 44.1 | — |
| Product | | | | | | |
| Run A | 43.54 | 0.62 | 0.93 | 0.39 | 2.64 | 0.19 |
| B | 47.33 | 0.73 | 1.09 | 0.42 | 0.55 | 0.99 |
| C | 39.9 | 0.99 | 1.39 | 0.38 | 0.05 | 6.13 |
| D | 44.74 | 1.09 | 1.23 | 0.43 | 0.09 | 2.64 |
| E | 40.2 | 1.30 | 1.18 | 0.44 | 0.10 | 3.47 |
| F | 40.0 | 1.15 | 0.70 | 0.41 | 0.09 | 2.22 |
| G | 42.1 | 1.01 | 0.73 | 0.40 | 0.14 | 2.14 |

Pebble acid from run "G" of Table 4 was subjected to solvent extraction. The ratio of the organic phase to aqueous phase was 10/1 using three extraction cells. The organic phase contained a 0.4 molar solution of dinonylnaphthalene-sulfonic acid in kerosene containing 10% by weight isodecanol.

| Impurity | % Removed |
|---|---|
| CaO | 82 |
| MgO | 63 |
| $Al_2O_3$ | 4.5 |
| $Fe_2O_3$ | 4.7 |

EXAMPLE 5

A 30% $P_2O_5$ wet process phosphoric acid was prepared from North Florida phosphate rock, dilute phosphoric acid and sulfuric acid. The metallic impurity content of the phosphoric acid analyzed as follows:

| Metallic Impurity Analyzed As | Grams/Liter Impurity In Phosphoric Acid |
|---|---|
| $Fe_2O_3$ | 7.15 |
| $Al_2O_3$ | 13.36 |
| MgO | 4.26 |
| CaO | 2.46 |

The acid was extracted with organic sulfonic acid extractants employing a 0.4 M sulfonic acid kerosene solution containing 10% isodecanol at a volume ratio of 1:4 phosphoric acid solution to extractant solution to obtain the following results:

WEIGHT PERCENTAGE OF METALLICS REMOVED

| Sulfonic Acid Extractant | $Fe_2O_3$ | $Al_2O_3$ | MgO | CaO | Total Weight Percent of Metallics Removed |
|---|---|---|---|---|---|
| Dinonylnaphthalene Sulfonic Acid | 3.5 | 16.2 | 48.5 | 63.4 | 22.0 |
| 5-dodecanoyl-2-Chlorobenzene Sulfonic Acid | 24.6 | 23.8 | 53.7 | 58.4 | 33.1 |
| 5-nonyl-2-ethoxy Benzenesulfonic Acid | 21.0 | 37.5 | 59.5 | 63.5 | 35.0 |
| 3,5-di-tertoctyl-2-alphamethoxy benzenesulfonic acid | 16.5 | 38 | 63.9 | 74.0 | 38.7 |
| 3,5-di-tertoctyl-2-hydroxy benzene sulfonic acid | 61.2 | 1.2 | 62.7 | 57.7 | 39.5 |

The above results show that halo-, alkoxy and omega-carboxy alkoxy substituted aryl sulfonic acids have enhanced powers of iron and aluminum extraction when compared to the unsubstituted aryl sulfonic acids.

What is claimed is:

1. A process for the purification of phosphoric acid obtained from the digestion of phosphate bearing rock containing metal impurities which comprise calcium, magnesium, aluminum, ferric iron, and ferrous iron, which process comprises:
    (a) contacting high alumina phosphate pebble rock having a bone phosphate of lime value less than about 68 with aqueous phosphoric acid containing from about 10% up to about 35% $P_2O_5$ at an elevated temperature of from about 140° F. to about 220° F. to form a reaction mass containing extracted phosphate values from the phosphate pebble rock in the form of monocalcium phosphate and a residual solid phosphate pebble rock gangue;
    (b) contacting the reaction mass with concentrated sulfuric acid comprising from about 90% to about 100% $H_2SO_4$ at an elevated temperature of from about 140° F. to about 220° F. to convert the monocalcium phosphate to solid calcium sulfate and phosphoric acid and form a crude phosphoric acid containing solid calcium sulfate, metal impurities selected from the group consisting of calcium, magnesium, aluminum, ferric iron and ferrous iron and solid phosphate pebble rock gangue;
    (c) separating the crude phosphoric acid containing the ionic metal impurities from the solid phosphate pebble rock gangue and the solid calcium sulfate;
    (d) contacting the crude phosphoric acid containing ionic metal impurities with a water-immiscible organic solvent containing a water-immiscible organic sulfonic acid compound selected from the group consisting of alkylaryl, polyalkylaryl, alkanoylaryl, polyalkanoylaryl sulfonic acids and aromatic ring-substituted derivatives thereof wherein the substituent is selected from fluoro, bromo, chloro, iodo, hydroxy, alkoxy and omega-carboxyalkoxy groups to extract ionic metal impurities and form:

(i) a water-immiscible organic phase containing the organic sulfonic acid compound containing extracted ionic metal impurities; and (ii) an aqueous phase containing a purified phosphoric acid; and (e) separating the aqueous phase containing the purified phosphoric acid from the water-immiscible organic phase containing the organic sulfonic acid compound containing extracted ionic metal impurities.

2. The process of claim 1 including the following steps:

(f) regenerating the water-immiscible organic sulfonic acid compound containing extracted metallic impurities by contacting the water-immiscible phase containing the organic sulfonic acid compound containing extracted ionic metal impurities from step (e) with a mineral acid selected from the group consisting of sulfuric acid, hydrochloric acid, and nitric acid to form metallic salts of said mineral acids and the water-immiscible phase containing the water-immiscible sulfonic acid compound in the free acid form; and (g) separating the water-immiscible organic phase containing the organic sulfonic acid compound in free-acid form, from the metallic salts of said mineral acid.

3. The process of claim 1 wherein said high alumina phosphate rock pebble contains at least about 2.0% by weight $Al_2O_3$.

4. The process of claim 3 wherein said high alumina phosphate rock pebble contains at least about 2.5% by weight $Al_2O_3$.

5. The process of claim 1 wherein the total of the analysis of $Al_2O_3$ and $Fe_2O_3$ of said high alumina phosphate pebble rock is at least about 3.2 weight %.

6. The process as recited in claim 1 in which the $P_2O_5$ content of the phosphoric acid used in the first contacting step (a) is from about 25% to about 35%.

7. The process as recited in claim 1 in which the weight ratio of the phosphate pebble rock to the phosphoric acid gives a slurry density of about 20% to about 45% by weight.

8. The process as recited in claim 1 in which the weight ratio of the phosphate pebble rock to the phosphoric acid gives a slurry density of about 30% by weight.

9. The process as recited in claim 1 in which the phosphate pebble rock is contacted with the phosphoric acid at from about 140° F. to about 170° F. and the reaction mass is contacted with sulfuric acid at from about 140° F. to about 170° F.

10. The process as recited in claim 1 in which the phosphate pebble rock is contacted with the phosphoric acid at about 155° F. to about 170° F. and the reaction mass is contacted with sulfuric acid at about 155° F. to about 170° F.

11. The process as recited in claim 1 in which the phosphate pebble rock is contacted with the phosphoric acid at about 180° F. to about 220° F. and the resulting reaction mass is contacted with sulfuric acid at about 180° F. to about 220° F., whereby said calcium sulfate in steps (b) and (c) comprises calcium sulfate hemihydrate and wherein in step (d) said crude phosphoric acid contains from about 40% to about 47% $P_2O_5$.

12. The process as recited in claim 11 in which the phosphate pebble rock is contacted with the phosphoric acid at about 190° F. to about 210° F. and the reaction mass is contacted with sulfuric acid at about 190° F. to about 210° F.

13. The process of claim 1 in which the phosphate pebble rock is comminuted to −60 mesh prior to said contacting with phosphoric acid.

14. The process as recited in claim 1 in which the water-immiscible organic sulfonic acid compound contains at least 12 carbon atoms.

15. The process as recited in claim 1 in which the water-immiscible organic sulfonic acid compound contains from about 14 carbon atoms up to about 30 carbon atoms.

16. The process as recited in claim 1 in which the water-immiscible organic sulfonic acid compound is dissolved in a water-immiscible organic solvent.

17. The process as recited in claim 16 in which the water-immiscible organic solvent for the water-immiscible organic sulfonic acid compound is a saturated hydrocarbon having a boiling point of about 120° C. up to about 230° C., a flash point of about 15° C. up to about 70° C., a viscosity of about 1.5 to about 1.7 centipoise and a density below the density of the crude phosphoric acid.

18. The process as recited in claim 16 in which the water-immiscible organic sulfonic acid compound is dissolved in a water-immiscible organic solvent selected from the group consisting of kerosene, mineral spirits, benzene, naphtha, xylene, toluene, nitrobenzene, methylene chloride, isooctane and heptane at a concentration of the water-immiscible organic sulfonic acid compound dissolved in the water-immiscible organic solvent of from about 0.1 molar to about 1.0 molar.

19. The process as recited in claim 18 in which from about 0.1% up to about 20% by weight of a phase separator adjunct compound is dissolved in the solution of the water-immiscible organic sulfonic acid compound in a water-immiscible solvent.

20. The process as recited in claim 19 in which the phase separator adjunct compound is selected from water-immiscible aliphatic alcohols.

21. The process as recited in claim 20 in which the phase separator adjunct compound comprises isodecanol.

22. The process as recited in claim 1 in which the volumetric ratio of the water-immiscible organic phase to the phosphate pebble acid is from about 2 to 1 up to about 12 to 1.

23. The process as recited in claim 1 in which the volumetric ratio of the water-immiscible organic phase to the phosphate pebble acid is from about 4 to 1 up to about 8 to 1.

24. The process as recited in claim 1 in which the water-immiscible organic sulfonic acid compound is selected from the group consisting of dinonylnaphthalenesulfonic acid, 5-dodecanoyl-2-chlorobenzenesulfonic acid, 5-nonyl-2-ethoxybenzenesulfonic acid, 3,5-di-t-octyl-2-(alphacarboxymethoxy)benzenesulfonic acid, and 3,5-di-t-octyl-2-hydroxybenzenesulfonic acid.

25. The process of claim 1 wherein said phosphate pebble rock has a bone phosphate of lime value in the range of about 68 to about 38 and analyzes in the range of about 17.8–31.2% $P_2O_5$.

26. The process of claim 25 wherein said bone phosphate of lime value is no greater than about 58.

27. A process for the production of high purity phosphoric acid from phosphate-bearing, high alumina pebble having a bone phosphate of lime value less than about 68 and containing metal impurities comprising calcium, magnesium, aluminum, ferric iron and ferrous iron, said process comprising:
   (a) contacting the pebble with dilute aqueous phosphoric acid at a temperature of from about 140° F. to about 170° F. to form a reaction mass containing extracted phosphate values from the pebble in the form of dissolved calcium monophosphate;
   (b) contacting the reaction mass with sulfuric acid at a temperature of from about 140° F. to about 170° F. to convert the calcium monophosphate to solid gypsum and phosphoric acid and to form dilute crude phosphoric acid containing solid pebble gangue and at least one of said ionic metal impurities comprising calcium, magnesium, aluminum, ferric iron and ferrous iron;
   (c) separating the dilute, crude phosphoric acid containing the ionic metal impurities from the pebble gangue;
   (d) contacting the dilute, crude phosphoric acid with at least one water-immiscible liquid organic sulfonic acid compound selected from alkyl sulfonic acids, alkylaryl sulfonic acids and polyalkylaryl sulfonic acids and mixtures thereof, said sulfonic acids having at least 12 carbon atoms, said members of the group consisting of alkoxy, alkanonyl, halo, hydroxy, and nitro groups; to extract ionic metal impurities and form:
      (i) an organic phase containing the liquid organic sulfonic acid compound and extracted ionic metal impurities;
      (ii) an aqueous phase containing purified dilute aqueous phosphoric acid;
   (e) separating the aqueous phase containing the purified dilute aqueous phosphoric acid from the water-immiscible organic phase;
   (f) regenerating the liquid organic sulfonic compound by contact with a mineral acid for recycle; and
   (g) concentrating the purified dilute phosphoric acid.

28. The process of claim 27 in which the phosphate pebble rock having a mesh size greater than about 14 is comminuted to a suitable size range prior to contacting with phosphoric acid.

29. The process of claim 28 in which the phosphate pebble rock is comminuted to −60 mesh prior to contacting with phosphoric acid.

* * * * *